US012591275B2

(12) United States Patent
Lin

(10) Patent No.: US 12,591,275 B2
(45) Date of Patent: Mar. 31, 2026

(54) SUPPORT AND METHOD FOR MANUFACTURING SAME, FLEXIBLE DISPLAY MODULE, AND ELECTRONIC DEVICE

(71) Applicant: BOE Technology Group Co., Ltd., Beijing (CN)

(72) Inventor: Xinqi Lin, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 222 days.

(21) Appl. No.: 18/289,122

(22) PCT Filed: Oct. 14, 2022

(86) PCT No.: PCT/CN2022/125265
§ 371 (c)(1),
(2) Date: Nov. 1, 2023

(87) PCT Pub. No.: WO2024/077581
PCT Pub. Date: Apr. 18, 2024

(65) Prior Publication Data
US 2025/0093914 A1 Mar. 20, 2025

(51) Int. Cl.
G06F 1/16 (2006.01)

(52) U.S. Cl.
CPC .................................. G06F 1/1652 (2013.01)

(58) Field of Classification Search
CPC ...................................................... G06F 1/1652
See application file for complete search history.

(56) References Cited

U.S. PATENT DOCUMENTS

| | | | | | |
|---|---|---|---|---|---|
| 11,619,975 | B2 * | 4/2023 | Cai | .......................... | G06F 1/1652 |
| | | | | | 361/679.01 |
| 11,793,061 | B2 * | 10/2023 | Cai | ............................ | B32B 3/14 |
| | | | | | 361/807 |
| 11,849,551 | B2 * | 12/2023 | Choi | ....................... | G06F 1/1652 |
| 11,968,791 | B2 * | 4/2024 | Zhang | ..................... | G06F 1/1652 |
| 12,144,132 | B2 * | 11/2024 | Gao | ........................ | G06F 1/1652 |

(Continued)

FOREIGN PATENT DOCUMENTS

| | | |
|---|---|---|
| CN | 110767098 A | 2/2020 |
| CN | 112436041 A | 3/2021 |

(Continued)

OTHER PUBLICATIONS

Extended European search report of counterpart European application No. 22961769.1 issued on May 9, 2025.

*Primary Examiner* — Lisa Lea-Edmonds
(74) *Attorney, Agent, or Firm* — XSENSUS LLP

(57) ABSTRACT

Provided is a support, including a flexible support layer and a plurality of support strips. The flexible support layer has a first surface and a second surface opposite to each other. The second surface is configured to support a flexible display panel. The flexible support layer includes a slidable-rollable region and a planar support region adjacent to each other. The plurality of support strips are disposed on the first surface and in the slidable-rollable region, and the plurality of support strips are successively arranged along a first direction away from the planar support region. The first direction is parallel to the first surface and intersected with a lengthwise direction of the support strip.

19 Claims, 7 Drawing Sheets

(56)  References Cited

U.S. PATENT DOCUMENTS

| | | | | |
|---|---|---|---|---|
| 12,185,483 | B2 * | 12/2024 | Chu | H05K 5/0217 |
| 12,282,362 | B2 * | 4/2025 | Luo | G06F 1/1675 |
| 2021/0165447 | A1 * | 6/2021 | Wang | G06F 1/1616 |
| 2022/0058989 | A1 | 2/2022 | Chen et al. | |
| 2022/0221907 | A1 * | 7/2022 | Cai | G06F 1/1624 |
| 2022/0255023 | A1 * | 8/2022 | Cai | B32B 3/14 |
| 2022/0276678 | A1 * | 9/2022 | Luo | G06F 1/1675 |
| 2022/0386485 | A1 * | 12/2022 | Dong | G06F 1/1652 |
| 2023/0034440 | A1 * | 2/2023 | Xie | G09F 9/301 |
| 2023/0063858 | A1 * | 3/2023 | Cavallaro | G06F 1/1656 |
| 2023/0098597 | A1 * | 3/2023 | Gao | H05K 5/0217 |
| | | | | 361/807 |
| 2023/0103864 | A1 * | 4/2023 | Lin | G09F 9/301 |
| | | | | 428/213 |
| 2023/0165039 | A1 | 5/2023 | Yang et al. | |
| 2024/0040717 | A1 * | 2/2024 | Zhang | G09F 9/301 |
| 2024/0074072 | A1 * | 2/2024 | Zhao | G06F 1/1641 |
| 2025/0093914 | A1 * | 3/2025 | Lin | G06F 1/1652 |

FOREIGN PATENT DOCUMENTS

| | | | |
|---|---|---|---|
| CN | 213241716 | U | 5/2021 |
| CN | 113470535 | A | 10/2021 |
| CN | 113516920 | A | 10/2021 |
| CN | 113539070 | A | 10/2021 |
| CN | 214336182 | U | 10/2021 |
| CN | 214541377 | U | 10/2021 |
| CN | 113658510 | A | 11/2021 |
| CN | 114023196 | A | 2/2022 |
| CN | 114078369 | A | 2/2022 |
| CN | 114373395 | A | 4/2022 |
| CN | 114822227 | A | 7/2022 |
| WO | 2022/119395 | A1 | 6/2022 |

* cited by examiner

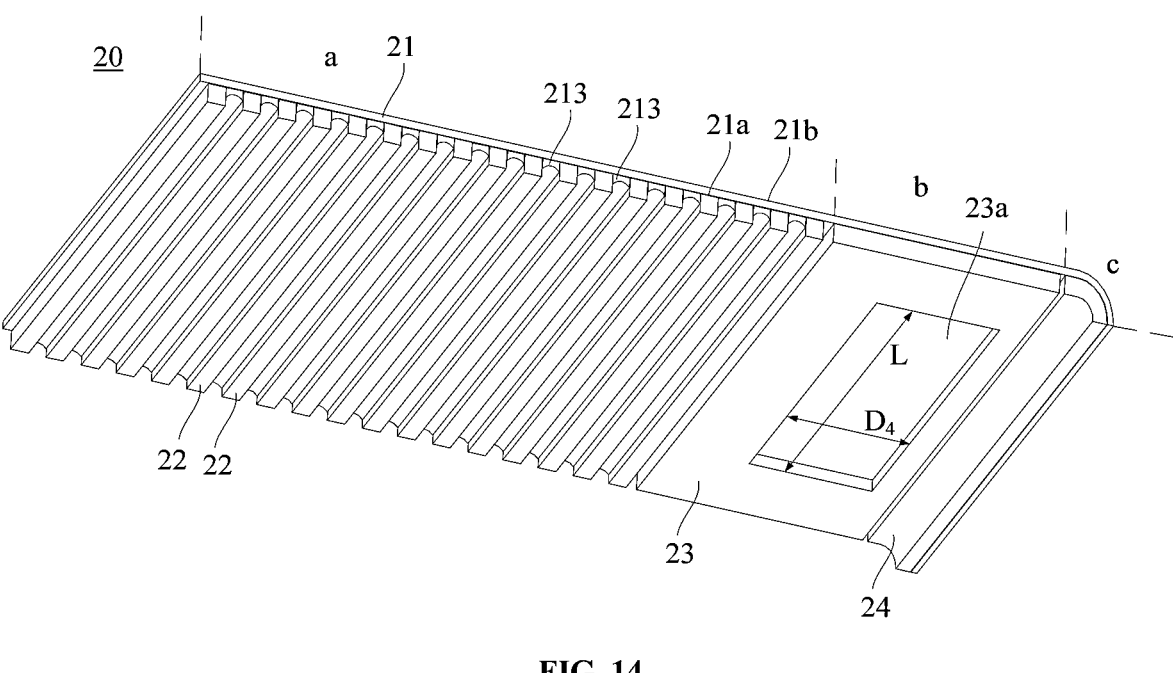
FIG. 14
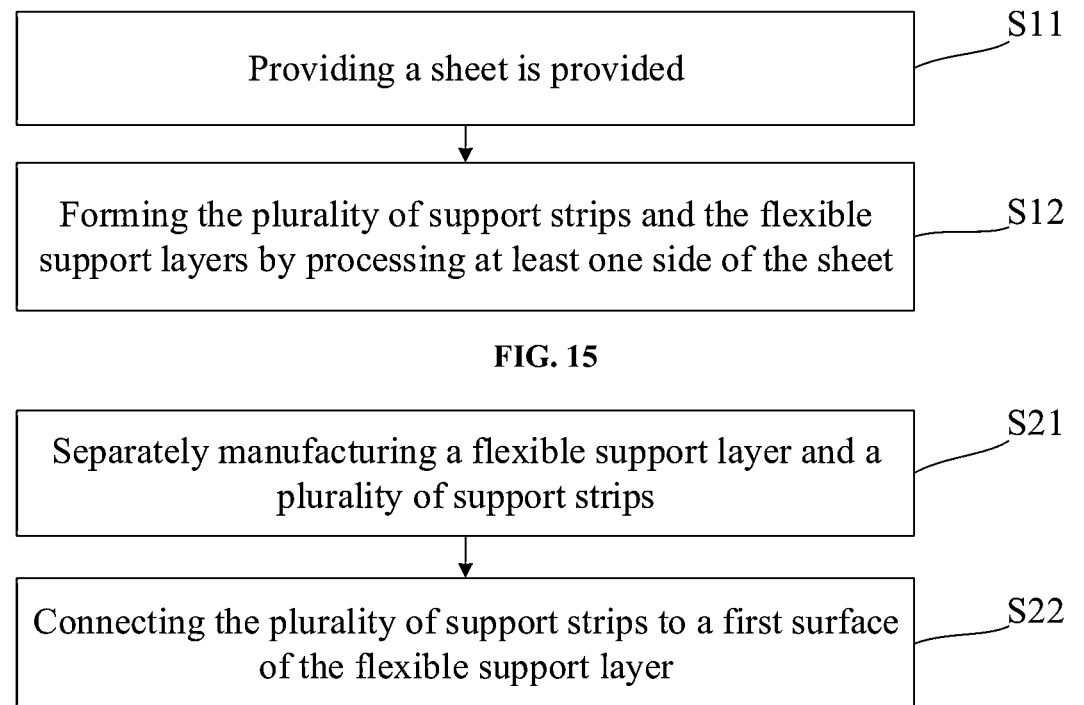
| | |
|---|---|
| Providing a sheet is provided | S11 |
| ↓ | |
| Forming the plurality of support strips and the flexible support layers by processing at least one side of the sheet | S12 |
FIG. 15
| | |
|---|---|
| Separately manufacturing a flexible support layer and a plurality of support strips | S21 |
| ↓ | |
| Connecting the plurality of support strips to a first surface of the flexible support layer | S22 |
FIG. 16

SUPPORT AND METHOD FOR MANUFACTURING SAME, FLEXIBLE DISPLAY MODULE, AND ELECTRONIC DEVICE

CROSS-REFERENCE TO RELATED APPLICATION

The present disclosure is a U.S. national stage of international application No. PCT/CN2022/125265, filed on Oct. 14, 2022, the content of which is herein incorporated by reference in its entirety.

TECHNICAL FIELD

The present disclosure relates to the field of display technology, and in particular, relates to a support and a method for manufacturing the same, a flexible display module, and an electronic device.

BACKGROUND

With the development of technologies, electronic devices are being more and more widely used for a variety of purposes, and have become indispensable in people's daily work and life. Slidable-rollable electronic devices are popular among people due to their ease of portability and large display areas.

SUMMARY

Some embodiments of the present disclosure provide a support and a method for manufacturing the same, a flexible display module, and an electronic device. The technical solutions are as follows.

According to some embodiments of the present disclosure, a support is provided. The support includes a flexible support layer and a plurality of support strips; wherein the flexible support layer has a first surface and a second surface opposite to each other, the second surface being configured to support a flexible display panel, and the flexible support layer includes a slidable-rollable region and a planar support region adjacent to each other; and the plurality of support strips are disposed on the first surface and in the slidable-rollable region, and the plurality of support strips are successively arranged along a first direction away from the planar support region, wherein the first direction is parallel to the first surface and intersected with a lengthwise direction of the support strip.

In some embodiments, in the slidable-rollable region, the flexible support layer includes a pattern, wherein the pattern includes a plurality of grooves and/or a plurality of through holes.

In some embodiments, the pattern is between adjacent support strips.

In some embodiments, a region, opposite to the support strip, of the second surface has a convex ledge, wherein a lengthwise direction of the convex ledge is consistent with the lengthwise direction of the support strip.

In some embodiments, a surface, distal from the support strip, of the convex ledge is a curved convex surface.

In some embodiments, the convex ledge includes a top surface and two side surfaces adjacent to the top surface, wherein the top surface is distal from the support strip, the two side surfaces are opposite to each other, one of the side surfaces being proximal to the planar support region, and a first fillet is provided at a connection between the side surface and the top surface.

In some embodiments, the support strip has a cross section in the shape of a trapezoid, wherein an upper base of the trapezoid is distal from the flexible support layer; or the support strip has a cross section in the shape of a rectangle.

In some embodiments, the support further includes an elastic filler, between adjacent support strips and connected to the flexible support layer and the support strip.

In some embodiments, a surface, distal from the flexible support layer, of the elastic filler is a curved concave surface.

In some embodiments, side walls close to each other of adjacent support strips are concave surfaces.

In some embodiments, a surface, proximal to the flexible support layer, of the support strip is a curved convex surface, and the elastic filler is in at least a portion region of the curved convex surface.

In some embodiments, a second fillet is provided at a connection between a surface, proximal to the flexible support layer, of the support strip and a side wall of the support strip, and the elastic filler is disposed at the second fillet.

In some embodiments, the support further includes a planar support layer, disposed in the planar support region and on the first surface, wherein a surface, distal from the flexible support layer, of the planar support layer includes an accommodation groove.

In some embodiments, the flexible support layer further includes a curved region, disposed on a side, distal from the slidable-rollable region, of the planar support region.

In some embodiments, in the first direction, a ratio of a distance between adjacent support strips to a width of the support strip ranges from 0.5 to 2.

According to some embodiments of the present disclosure, a method for manufacturing a support is provided. The method includes: forming a plurality of support strips on a first surface of a flexible support layer; wherein the flexible support layer includes a first surface and a second surface opposite to each other, the second surface being configured to support a flexible display panel, and the flexible support layer includes a slidable-rollable region and a planar support region adjacent to each other; and the plurality of support strips are disposed on the first surface and in the slidable-rollable region, and the plurality of support strips are successively arranged along a first direction away from the planar support region, wherein the first direction is parallel to the first surface and intersected with a lengthwise direction of the support strip.

In some embodiments, forming the plurality of support strips on the first surface of the flexible support layer includes: manufacturing the flexible support layer and the plurality of support strips separately; and connecting the plurality of support strips to the first surface of the flexible support layer.

In some embodiments, forming the plurality of support strips on the first surface of the flexible support layer includes: providing a sheet; and forming the plurality of support strips and the flexible support layer by processing at least one side of the sheet.

According to some embodiments of the present disclosure, a flexible display module is provided. The flexible display module includes a flexible display panel and the support as described above, wherein the flexible display panel is disposed on a second surface of the support.

According to some embodiments of the present disclosure, an electronic device is provided. The electronic device includes the flexible display module as described above.

BRIEF DESCRIPTION OF DRAWINGS

For clearer descriptions of the technical solutions in the embodiments of the present disclosure, the following briefly introduces the accompanying drawings to be required in the descriptions of the embodiments. Apparently, the accompanying drawings in the following description show merely some embodiments of the present disclosure, and persons of ordinary skills in the art may still derive other drawings from these accompanying drawings without creative efforts.

FIG. 14 is a schematic structural diagram of a support according to embodiments of the present disclosure;

FIG. 15 is a flowchart of a method for manufacturing a support of a flexible display module according to some embodiments of the present disclosure; and FIG. 16 is a flowchart of a method for manufacturing a support of a flexible display module according to some embodiments of the present disclosure.

DETAILED DESCRIPTION

The present disclosure is described in further detail with reference to the accompanying drawings, to clearly present the objects, technical solutions, and advantages of the present disclosure.

It should be noted that unless otherwise defined, technical or scientific terms used in the embodiments of the present disclosure shall have ordinary meanings understandable by persons of ordinary skill in the art to which the disclosure belongs. The terms "first," "second," and the like used in the embodiments of the present disclosure are not intended to indicate any order, quantity or importance, but are merely used to distinguish the different components. The terms "comprise," "include," and derivatives or variations thereof are used to indicate that the element or object preceding the terms covers the element or object following the terms and its equivalents, and shall not be understood as excluding other elements or objects. The terms "connect," "contact," and the like are not intended to be limited to physical or mechanical connections, but may include electrical connections, either direct or indirect connection. The terms "on," "under," "left," and "right" are only used to indicate the relative positional relationship. When the absolute position of the described object changes, the relative positional relationship may change accordingly.

The slidable-rollable electronic device includes a flexible display module and a reel. A portion of the flexible display module is rolled on the reel, which is unrolled from the reel during use, and then rolled on the reel after use.

The flexible display module includes a flexible display panel and a support, wherein the flexible display panel is secured to the support. The flexible display module is supported by the support upon being pulled out of the reel. Because the flexible display module needs to be rolled, the support needs to be structured in such a way that the flexible display module is easy to roll and has low stress.

Figure 1:
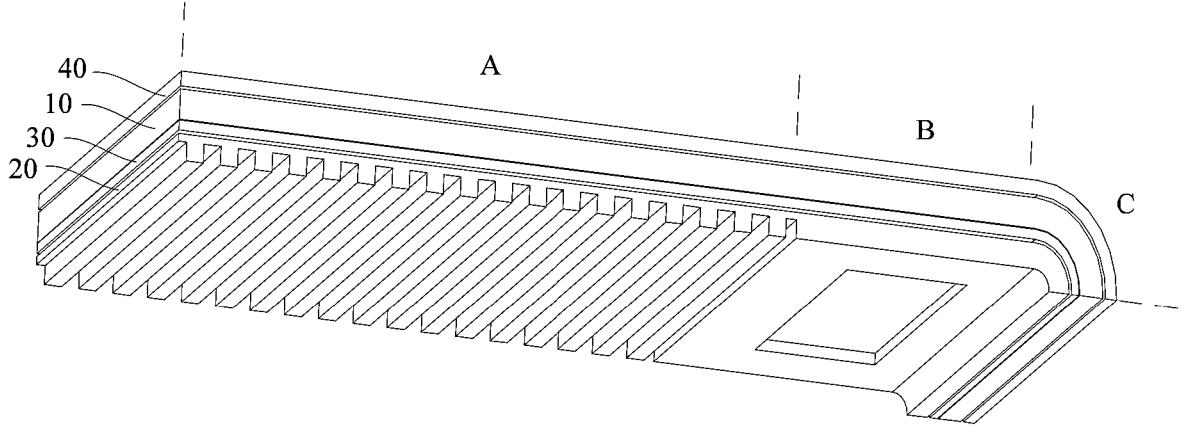
FIG. 1 is a schematic structural diagram of a flexible display module according to some embodiments of the present disclosure.

FIG. 1 is a schematic structural diagram of a flexible display module according to some embodiments of the present disclosure. As shown in FIG. 1, the flexible display module includes a flexible display panel 10 and a support 20. The flexible display panel 10 includes a front side and a back side opposite to each other, wherein the front side is a display surface for display. The support 20 is disposed on the back side of the flexible display panel 10 and is attached to the flexible display panel 10, in some embodiments, by bonding through a pressure-sensitive adhesive layer 30.

In some embodiments, the flexible display module further includes a flexible protective layer 40. The flexible protective layer 40 is disposed on the front side of the flexible display panel 10 and is, in some embodiments, bonded to the front side of the flexible display panel 10. The flexible protective layer 40 prevents the front side of the flexible display panel 10 from being damaged by the outside, such as preventing the front side of the flexible display panel 10 from being scratched.

Some embodiments of the present disclosure further provide an electronic device that includes the flexible display module shown in FIG. 1. The electronic device is, but is not limited to, a smartphone or a tablet computer.

The electronic device is a slidable-rollable electronic device. The electronic device further includes a reel. A portion of the flexible display module is rolled on the reel and is unrolled from the reel by pulling the flexible display module. In some embodiments, as shown in FIG. 1, the flexible display module includes a slidable-rollable portion A, a planar portion B, and a curved portion C. The slidable-rollable portion A is rolled on the reel, and the planar portion B and the curved portion C are outside the reel. The slidable-rollable portion A is unrolled from the reel by pulling the curved portion C when the display area needs to be enlarged.

The support 20 is configured to support the flexible display panel 10, such that the flexible display module is kept stable and is kept flat upon being unrolled from the reel while being capable of being rolled back on the reel.

Figure 2:
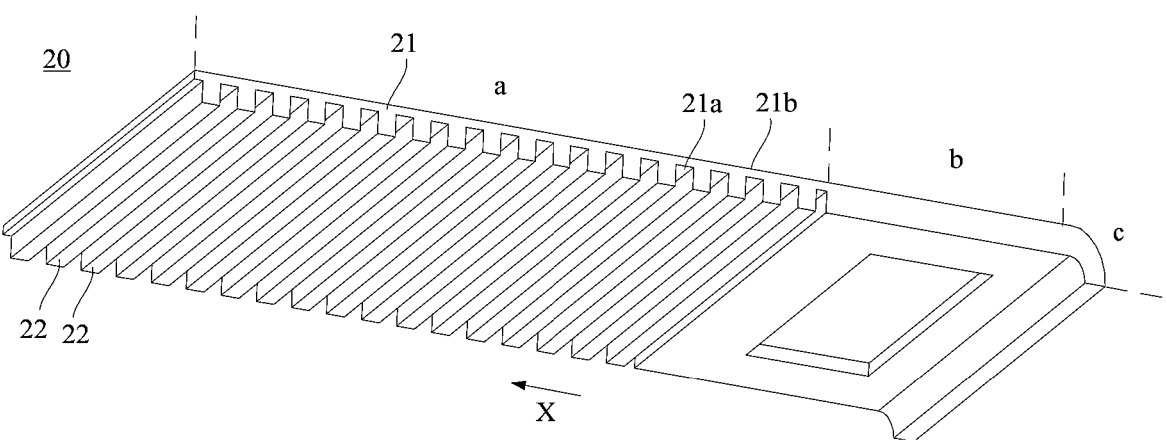
FIG. 2 is a schematic structural diagram of a support of a flexible display module according to some embodiments of the present disclosure.

FIG. 2 is a schematic structural diagram of a support of a flexible display module according to some embodiments of the present disclosure. As shown in FIG. 2, the support 20 includes a flexible support layer 21 and a plurality of support strips 22. The flexible support layer 21 has a first surface 21a and a second surface 21b opposite to each other. The second surface 21b is configured to support the flexible display panel 10. The second surface 21b is opposite to the back side of the flexible display panel 10 when the flexible display module is assembled.

The flexible support layer 21 includes a slidable-rollable region a and a planar support region b that are adjacent to each other. In the flexible display module, the slidable-rollable region a is in the slidable-rollable portion A, and the planar support region b is in the planar portion B.

The flexible support layer 21 further includes a curved region c. The curved region c is disposed on a side, distal from the slidable-rollable region a, of the planar support region b. In the flexible display module, the curved region c is in the curved portion C.

The slidable-rollable region a, the planar support region b, and the curved region c are respectively equivalent to skeletons of the slidable-rollable portion A, the planar portion B, and the curved portion C, providing support therefor.

A plurality of support strips 22 are disposed on the first surface 21a of the flexible support layer 21 and are within the slidable-rollable region A. The plurality of support strips 22 are successively arranged along a first direction X away from the planar support region B. The first direction X is parallel to the first surface 21a of the flexible support layer 21 and is intersected with a lengthwise direction of the support strip 22. The first direction X being parallel to the first surface 21a of the flexible support layer 21 herein is in the case that the slidable-rollable portion A is unrolled from the reel and is spread out.

In some embodiments, the first direction X is perpendicular to a second direction, wherein the second direction is the lengthwise direction of the support strip 22.

In the support 20 of the flexible display module, by providing the plurality of support strips 22 in the slidable-rollable region a of the flexible support layer 21, the support 20 has a larger thickness and a higher structural strength at positions where the support strips 22 are disposed, and thus provides better support for the flexible display module; and the support 20 has a smaller thickness and a lower structural strength at positions between adjacent support strips 22, which is favorable to the rolling of the slidable-rollable region a.

The thickness of the support 20 is a dimension of the support 20 in a direction perpendicular to the first surface 21a in a state where the support 20 is spread flat. A thickness direction of the support strip 22 is also perpendicular to the first surface 21a, and a width direction of the support strip 22 is perpendicular to the lengthwise direction and the thickness direction of the support strip 22. In the embodiments, the width direction of the support strip 22 is along the first direction X.

The support strip 22 and the flexible support layer 21 are an integral structure. In some embodiments, the flexible support layer 21 and the support strip 22 are formed by processing a single plate. Due to the one-piece structure, the overall structural strength of the support 20 is greater, and thus the support 20 is less prone to damage.

The support strip 22 and the flexible support layer 21 are independent structures. In some embodiments, the support strip 22 is bonded to the flexible support layer 21 after the support strip 22 and the flexible support layer 21 have been independently processed. Because the support strip 22 and the flexible support layer 21 are independent structures, they are processed independently during processing, with less difficulty in processing.

The support strip 22 and the flexible support layer 21 are made of metal materials, in some embodiments, stainless steel or titanium alloy. Where the support strip 22 and the flexible support layer 21 are independent structures, the support strip 22 and the flexible support layer 21 are made of the same or different materials.

Figure 3:
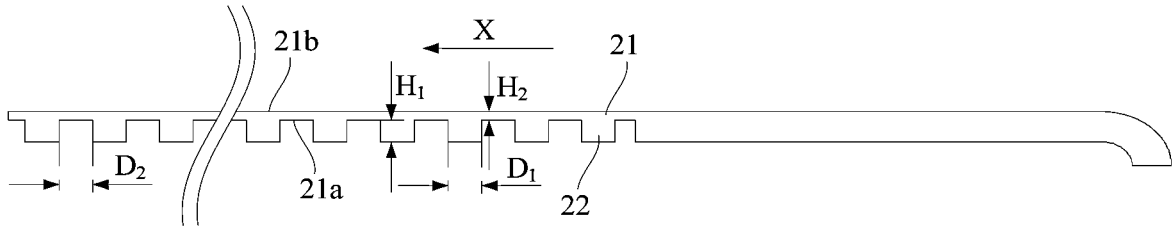
FIG. 3 is a side view of a support according to some embodiments of the present disclosure.

FIG. 3 is a side view of a support according to some embodiments of the present disclosure. As shown in FIG. 3, in the first direction X, a ratio of a distance D2 between adjacent support strips 22 to a width D1 of the support strip 22 ranges from 0.5 to 2.

Increasing the distance D2 between the support strips 22, the support effect of the support 20 on the slidable-rollable portion A is reduced, while in the case that the distance D2 is too small, the rolling of the slidable-rollable portion A into the reel is affected. Defining the distance D2 between the support strips 22 and the width D1 of the support strip 22 to be closer gives consideration to both the support effect and the rolling ability of the support 20.

Other factors affect the support effect and the rolling ability of the support 20. In some embodiments, there is at least a thickness H2 of the flexible support layer 21 that affects the support effect and the rolling ability of the support 20. Therefore, the ratio of the distance D2 between adjacent support strips 22 to the width D1 of the support strip 22 may be other values.

In some embodiments, the width D1 of the support strip 22 ranges from 0.3 mm to 10 mm, the thickness H1 of the support strip 22 ranges from 0.2 mm to 3 mm, and the distance D2 between adjacent support strips 22 ranges from 0.3 mm to 5 mm.

In some embodiments, the width D1 of the support strip 22 ranges from 0.4 mm to 10 mm, the thickness H1 of the support strip 22 ranges from 0.2 mm to 1 mm, and the distance D2 between adjacent support strips 22 ranges from 0.4 mm to 5 mm.

In some embodiments, the width D1 of the support strip 22 adjacent 0.3 mm to 3 mm, the thickness H1 of the support strip 22 adjacent 0.2 mm to 3 mm, and the distance D2 between adjacent support strips 22 adjacent 0.3 mm to 1 mm.

In some embodiments, the thickness H2 of the flexible support layer 21 ranges from 0.01 mm to 1 mm in the slidable-rollable region a. In some embodiments, the thickness H2 of the flexible support layer 21 ranges from 0.01 mm to 0.05 mm, 0.03 mm to 0.2 mm, or 0.2 mm to 0.9 mm.

In the slidable-rollable region a, the flexible support layer 21 is set to be thinner, which is conducive to increasing the rolling ability of the support 20 and reducing the stress of the support 20 upon being rolled.

Figure 4:
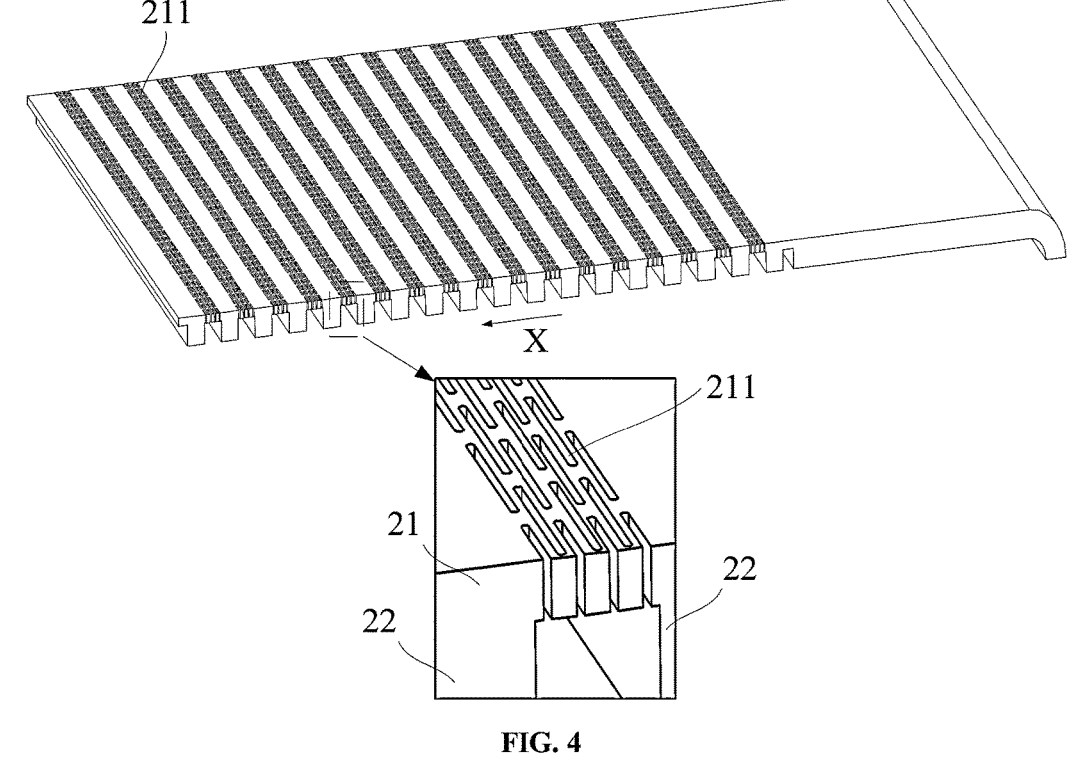
FIG. 4 is a schematic structural diagram of a support according to some embodiments of the present disclosure.

FIG. 4 is a schematic structural diagram of a support according to some embodiments of the present disclosure. As shown in FIG. 4, in the slidable-rollable region a, the flexible support layer 21 has a pattern 211. The pattern 211 includes a plurality of grooves and/or a plurality of through holes.

The stiffness of the flexible support layer 21 is reduced by providing the pattern 211, which facilitates the rolling of the support 20. The thickness of the flexible support layer 21 and whether or not the pattern 211 is provided both affect its stiffness, and the flexible support layer 21 is easily torn when the thickness is set too thin. Providing the pattern 211 makes it possible to set the thickness of the flexible support layer 21 in the slidable-rollable region a to be slightly larger, such that the structural strength is improved, and thus the tearing of the flexible support layer 21 in the slidable-rollable region a is avoided.

In some embodiments, the thickness H2 of the flexible support layer 21 in the slidable-rollable region a ranges from 0.1 mm to 1 mm.

In some embodiments, as shown in FIG. 4, in the slidable-rollable region a, the pattern 211 includes the plurality of through holes, which are strip-shaped. A lengthwise direction of the through hole is perpendicular to the first direction X.

The plurality of through holes are distributed as a plurality of rows arranged along the first direction X. Each row includes several through holes, and the through holes in adjacent two rows are distributed staggered from each other.

In the case that the pattern 211 includes grooves, the grooves are disposed on the first surface 21a and/or the second surface 21b of the flexible support layer 21. The grooves are also strip-shaped. The grooves are distributed in the same way as the through holes as described above. A depth of the groove ranges from ⅓ to ⅔ of the thickness H2 of the flexible support layer 21.

As shown in FIG. 4, the pattern 211 is between adjacent support strips 22. Because the support is thicker at positions where the support strips 22 are disposed, even if the patterns 211 are also provided at the positions where the support strips 22 are disposed, the improvement of the rolling ability to the support 20 is limited. Moreover, it is more economical to only provide the patterns 211 between adjacent support strips 22.

In some embodiments, the pattern 211 is formed by an etching process or computer numerical control machining, such as laser cutting. Because the pattern only needs to be formed in the region between adjacent support strips 22, less etching solution is used during the etching process, and a region to be processed is smaller during the computer numerical control machining, such that the processing cost is low with either method.

Figure 5:
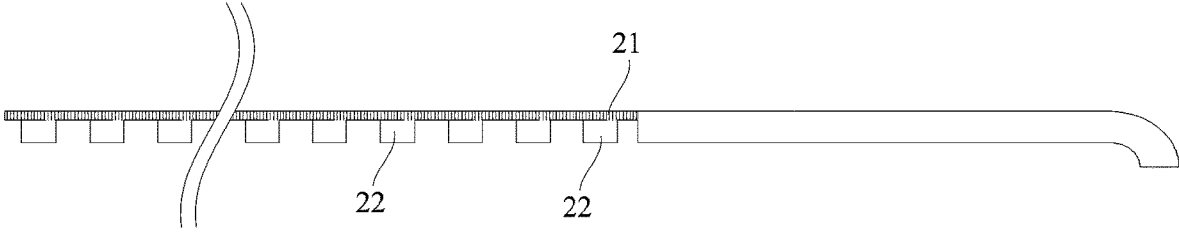
FIG. 5 is a schematic structural diagram of a support according to some embodiments of the present disclosure.

FIG. 5 is a schematic structural diagram of a support according to some embodiments of the present disclosure. As shown in FIG. 5, in this support, the pattern 211 is disposed throughout the slidable-rollable region a. Compared to the support shown in FIG. 4, in the support shown in FIG. the pattern 211 is also distributed at the position where the support strip 22 is disposed. For this support, although the processing cost is higher, it is easier to process because there is no need to precisely determine the region to be etched or CNC machined and just the entire slidable-rollable region a needs to be processed.

Figure 6:
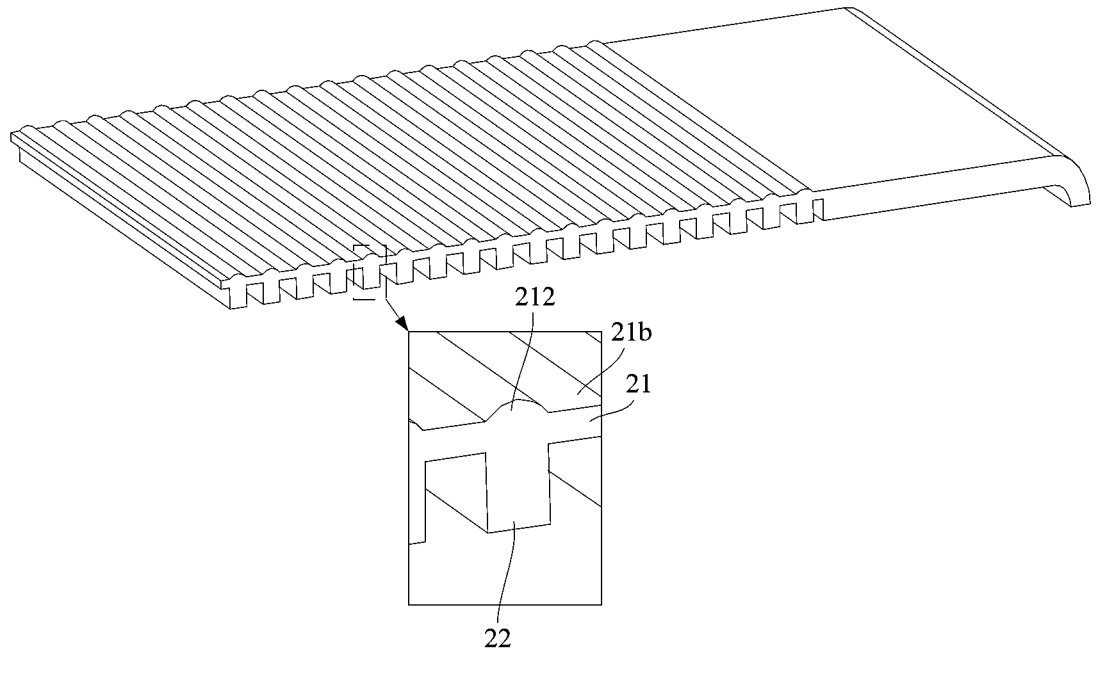
FIG. 6 is a side view of a support according to some embodiments of the present disclosure.

FIG. 6 is a side view of a support according to some embodiments of the present disclosure. As shown in FIG. 6, in this support, a region, opposite to the support strip 22, of the second surface 21b of the flexible support layer 21 has a convex ledge 212, and a lengthwise direction of the convex ledge 212 is the same as the lengthwise direction of the support strip 22.

The convex ledge 212 somewhat improves the support ability of the flexible support layer 21. Because the convex ledge 212 is arranged in the region opposite to the support strip 22, the bending ability of the flexible support layer 21 between adjacent support strips 22 are not affected.

As shown in FIG. 6, a surface, distal from the support strip 22, of the convex ledge 212 is a curved convex surface.

The second surface 21b of the flexible support layer 21 is configured to support the flexible display panel 10, and the surface, distal from the support strip 22, of the convex ledge 212 is designed to be the curved convex surface. The flexible display panel 10 is supported by the curved convex surface during rolling, such that the stress on the flexible display panel 10 is reduced, and thus the damage to the flexible display panel 10 is avoided.

In some embodiments, the curved convex surface is a column surface. That is, the curved convex surface is a curved surface formed by a straight line moving parallel along an arc, and is a part of a cylindrical surface. In some embodiments, a radius of the curved convex surface ranges from 0.5 mm to 5 mm.

Figure 7:
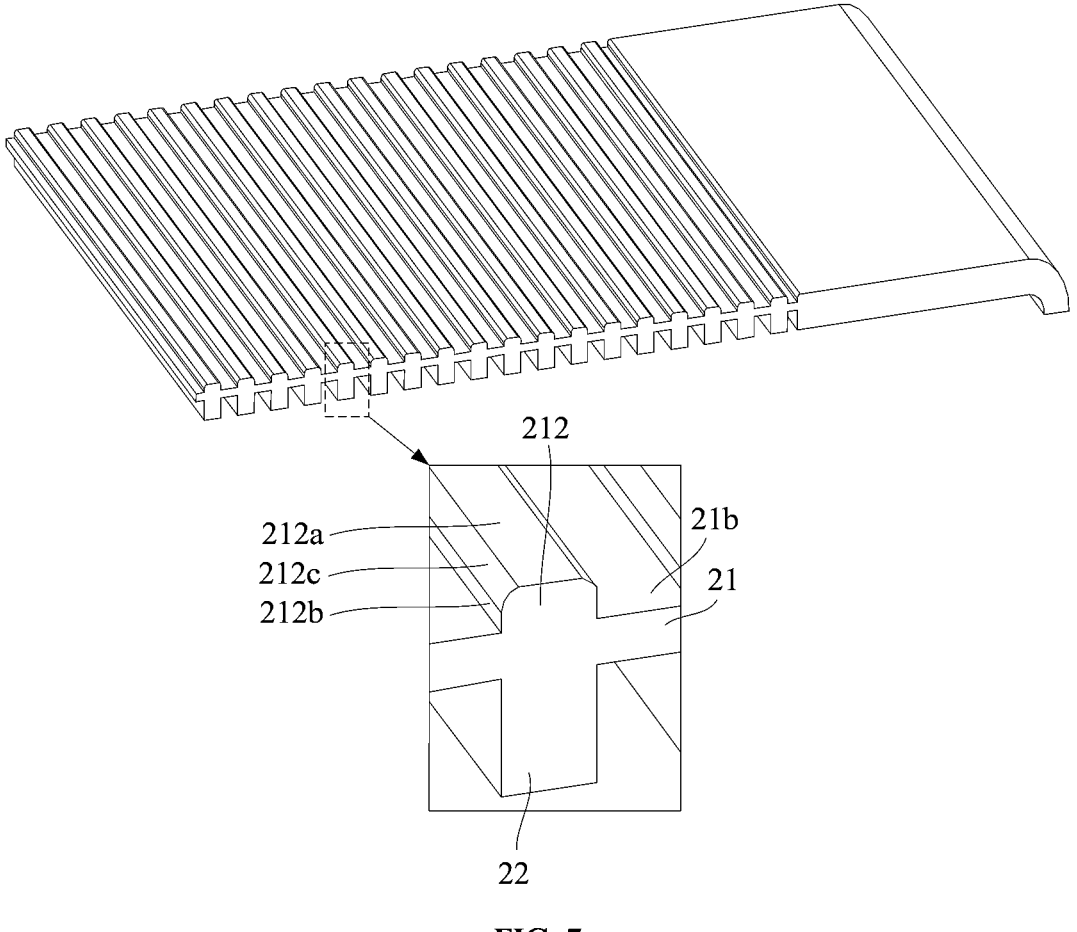
FIG. 7 is a side view of a support according to some embodiments of the present disclosure.

FIG. 7 is a side view of a support according to some embodiments of the present disclosure. As shown in FIG. 7, in the support, the convex ledge 212 includes a top surface 212a and two side surfaces 212b adjacent to the top surface 212a. The top surface 212a is distal from the support strip 22, the two side surfaces 212b are opposite to each other and one of the side surfaces 212b is proximal to the planar support region b. That is, the top surface 212a is a surface, distal from the support strip 22, of the convex ledge 212, and the two side surfaces 212b are arranged in the first direction X, with one of the side surfaces 212b being more proximal to the planar support region b than the other side surface 212b.

The side surface 212b has a first fillet 212c at a junction with the top surface 212a.

The first fillet 212c, like the curved convex surface in the support 20 shown in FIG. 6, is also capable of reducing the stress on the flexible display panel 10 during rolling to avoid damage to the flexible display panel 10. In addition, the top surface 212a also supports the flexible display panel 10, such that a contact area between the support 20 and the flexible display panel 10 is large, and thus a bonding area when bonding is large.

In some embodiments, the first fillet 212c has a radius ranging from 0.1 mm to 0.5 mm.

Figure 8:
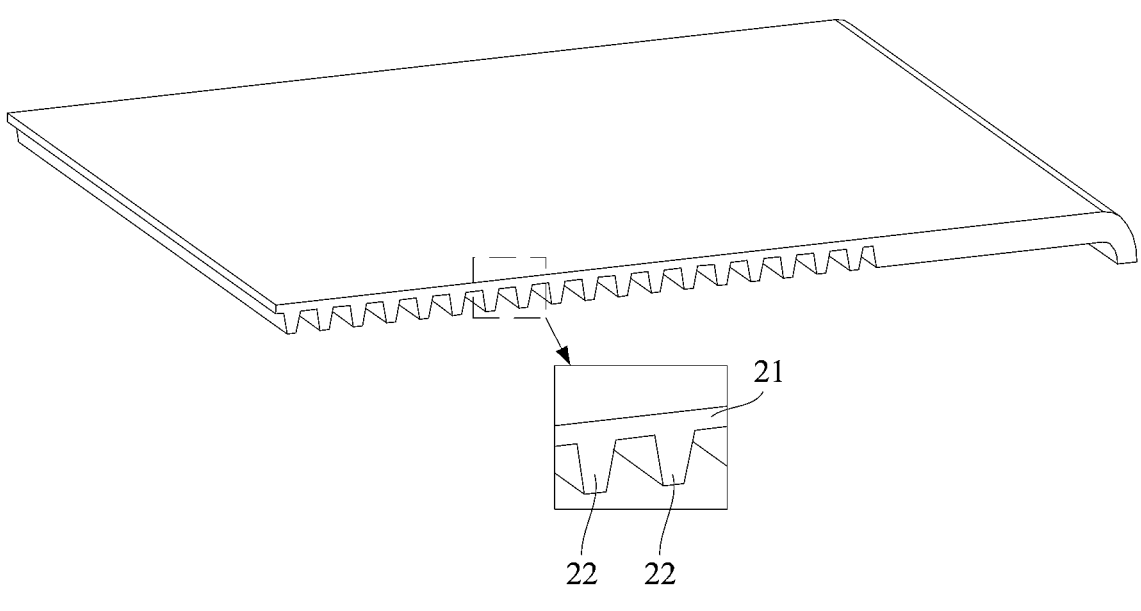
FIG. 8 is a side view of a support according to some embodiments of the present disclosure.

In some embodiments, cross sections of the support strips 22 shown in FIG. 1 to FIG. 7 are all rectangles. In some embodiments, FIG. 8 is a side view of a support according to some embodiments of the present disclosure. As shown in FIG. 8, the support strip 22 has a cross section in the shape of a trapezoid, and an upper base of the trapezoid is farther away from the flexible support layer 21. That is, the shorter base edge of the trapezoid is farther away from the flexible support layer 21 compared to the longer base edge.

During the rolling of the support, adjacent support strips 22 move closer to each other, and the smaller the radius of the rolling, the closer adjacent support strips 22, which makes it possible for adjacent support strips 22 to come into contact and squeeze each other as being rolled. By defining the cross section of the support strip 22 to be in the shape of a trapezoid and having the lower base of the trapezoid connected to the flexible support layer 21, a large space is formed between adjacent support strips 22 during rolling, such that the squeeze due to the contact between the support strips 22 is avoided.

In addition, a surface, distal from the flexible support layer 21, of the support strip 22 is in contact with the reel when being rolled on the reel. Because the cross section of the support strip 22 is a trapezoid, the surface, distal from the flexible support layer 21, of the support strip 22 is small, and the area in contact with the reel is small, such that the friction between the support 20 and the reel is reduced.

In some embodiments, a length of the upper base of the trapezoid is greater than ⅓ of the lower base and less than a length of the lower base of the trapezoid.

For the support strip 22 having a cross section in the shape of a trapezoid, a width is the length of the lower base, and a thickness is a height of the trapezoid, i.e., a distance between the lower base and the upper base.

In some embodiments, the length of the lower base of the trapezoid ranges from 0.3 mm to 3 mm, or in some embodiments, the length of the lower base of the trapezoid ranged from 0.4 mm to 10 mm.

Figure 9:
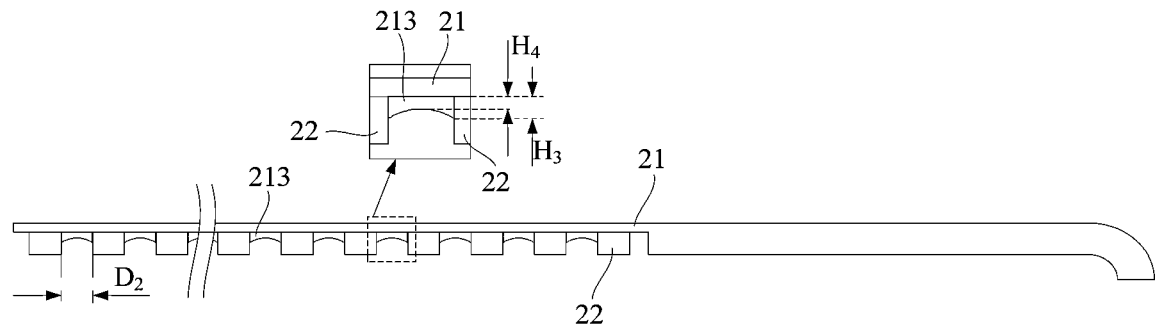
FIG. 9 is a side view of a support according to some embodiments of the present disclosure.

FIG. 9 is a side view of a support according to some embodiments of the present disclosure, as shown in FIG. 9, the support 20 further includes an elastic filler 213 between adjacent support strips 22. The elastic filler 213 is connected to the flexible support layer 21 and the support strip 22.

The elastic filler 213 supports the slidable-rollable region a. Moreover, due to the elastic filler 213, adjacent support strips 22 are always spaced apart from each other, such that the stability of the support 20 is improved.

FIG. 9 gives a description using a scenario where the support strip 22 and the flexible support layer 21 are independent structures as an example. For a support of this structure, the elastic filler 213 makes it possible to maintain a certain distance between adjacent support strips 22, which is also conducive to avoiding misalignment of the support strip 22 during the rolling process, and thus the risk of deformation of the support strip 22 or of being separated from the flexible support layer 21 is reduced.

For a support in which the support strip 22 and the flexible support layer 21 are an integral structure, the elastic filler 213 is likewise provided between adjacent support strips 22.

The elastic filler 213 is made of a polymer material having a better thermal stability, and a lower modulus. In some embodiments, it is made of silicone or thermoplastic polyurethane rubber.

A thickness of the elastic filler 213 is less than the thickness of the support strip 22, avoiding the elastic filler 213 from being higher than the support strip 22, such that the elastic filler 213 is prevented from contacting with the reel and generating a large friction force during rolling.

As shown in FIG. 9, a surface, distal from the flexible support layer 21, of the elastic filler 213 is a curved concave surface.

During the rolling of the support 20, the elastic filler 213 is squeezed by the support strips 22 on both sides and deforms. Defining the surface, distal from the flexible support layer 21, of the elastic filler 213 as a curved concave surface is favorable to the deformation of the elastic filler 213 and avoids generating a large stress.

During the spreading of the support 20, at a highest point of the curved concave surface, a thickness H3 of the elastic filler 213 is less than the thickness of the support strip 22 and not less than ⅓ of the thickness H1 of the support strip 22, and at a lowest point of the curved concave surface, a thickness H4 of the elastic filler 213 is not greater than ⅔ of the thickness of the support strip 22 and not less than ¼ of the thickness of the support strip 22. The highest point is a point where a distance from the curved concave surface to the first surface 21a of the flexible support layer 21 is the greatest, and the lowest of the curved concave surface is a point where a distance from the curved concave surface to the first surface 21a of the flexible support layer 21 is the least.

An average thickness of the elastic fillers 213 affects the rolling ability of the support 20. In the case that the average thickness is too large, a large stress is generated during rolling, which is unfavorable for rolling; and in the case that the average thickness is too small, the elastic filler 213 generates a limited amount of elastic force and has a smaller contact area with the support strip 22, which provides less support to the adjacent support strips 22.

Figure 10:
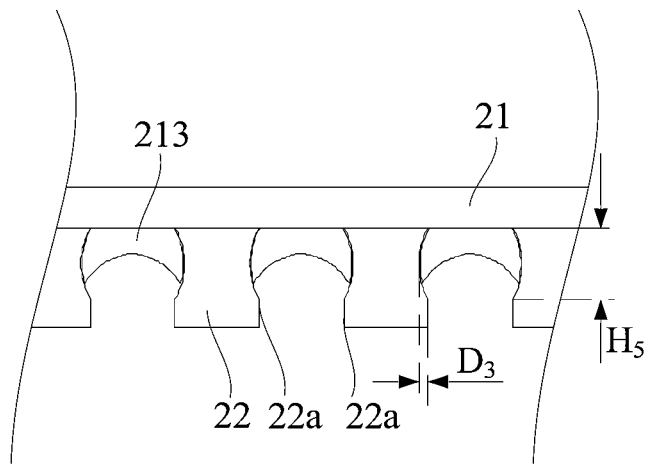
FIG. 10 is a partially enlarged schematic diagram of a support according to some embodiments of the present disclosure.

FIG. 10 is a partially enlarged schematic diagram of a support according to some embodiments of the present disclosure. As shown in FIG. 10, side walls 22a close to each other of adjacent support strips 22 are concave surfaces.

The elastic filler 213 abuts the side wall 22a of the support strip 22. By defining the side walls 22a of the support strips 22 as concave surfaces, the contact area between the elastic filler 213 and the support strip 22 is increased, such that the force of the support strip 22 on the elastic filler 213 is distributed, and the connection between the elastic filler 213 and the support strip 22 is more solid.

In some embodiments, at the spreading level of the support 20, in the thickness direction of the support strip 22a, a width H5 of a recessed portion of the side wall 22a is ⅔ to 1 time the thickness H1 of the support strip 22. A depth D3 of the recessed portion of the sidewall 22a is less than or equal to ⅕ of the width D1 of the support strip 22.

Figure 11:
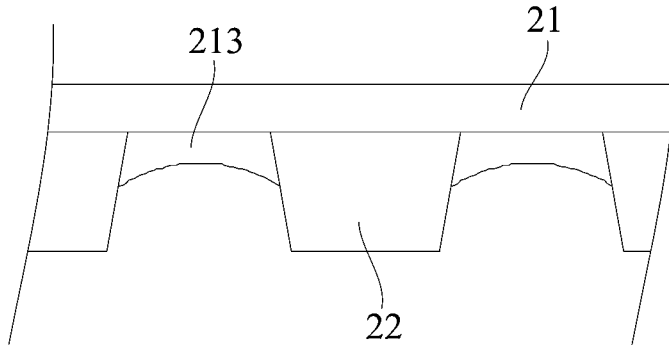
FIG. 11 is a partially enlarged schematic diagram of a support according to some embodiments of the present disclosure.

FIG. 11 is a partially enlarged schematic diagram of a support according to some embodiments of the present disclosure. As shown in FIG. 11, the support strip 22 has a cross section in the shape of a trapezoid and an upper base of the trapezoid is distal from the flexible support layer 21. The support 20 shown in FIG. 11 has an added elastic filler 213 compared to the support 20 shown in FIG. 8. Because the cross section of this support strip 22 is a trapezoid and the side wall of the support strip 22 22a is inclined, it is also beneficial to increase the contact area between the elastic filler 213 and the support strip 22.

In other embodiments, for the support strip 22 having a cross section in the shape of a trapezoid, the side wall 22a is also provided as a concave surface to further increase the contact area.

Figure 12:
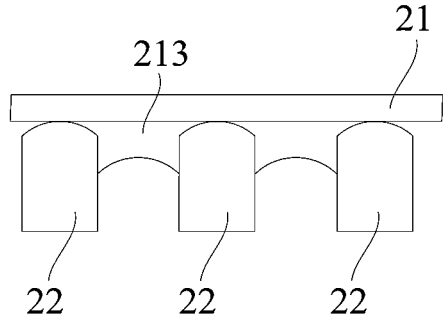
FIG. 12 is a partially enlarged schematic diagram of a support according to some embodiments of the present disclosure.

FIG. 12 is a partially enlarged schematic diagram of a support according to some embodiments of the present disclosure. As shown in FIG. 12, a surface, proximal to the flexible support layer 21, of the support strip 22 is a curved convex surface, and the elastic filler 213 is in at least a portion region of the curved convex surface.

During the rolling of the support 20, the surface, proximal to the flexible support layer 21, of the support strip 22 generates a certain squeeze, which is transmitted to the flexible display panel 10 through the flexible support layer 21. By defining the surface as a curved convex surface, the squeeze on the flexible display panel 10 is reduced, such that the stress is reduced, and the flexible display panel 10 is prevented from being damaged. The curved convex surface of the support strip 22 has a small contact surface with the flexible support layer 21 when connecting to the flexible support layer 21, in some embodiments, by means of adhesive bonding, which has a small bonding area, and thus the support strip 22 and the flexible support layer 21 are difficult to be connected with each other and are easily separated. The elastic filler 213 covers at least a portion region of the curved convex surface and fills between the curved convex surface and the first surface 21a of the flexible support layer 21, serving as a connection, such that the connection between the support strip 22 and the flexible support layer 21 are more firmly.

In some embodiments, a radius of the curved convex surface is not less than half of the width D1 of the support strip 22.

Figure 13:
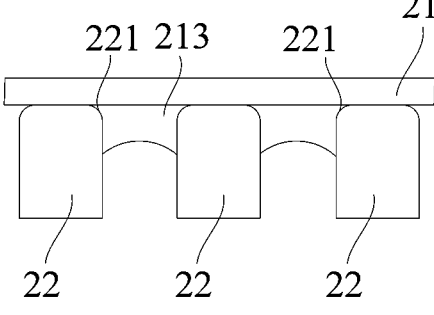
FIG. 13 is a partially enlarged schematic diagram of a support according to some embodiments of the present disclosure.

FIG. 13 is a partially enlarged schematic diagram of a support according to some embodiments of the present disclosure. As shown in FIG. 13, the support strip 22 has a second fillet 221 at a connection between the surface, proximal to the flexible support layer 21, of the support strip 22 and the side wall 22a of the support strip 22. The elastic filler 213 is disposed at the second fillet 221.

The second fillet 221 is also capable of reducing the squeeze of the support strip 22 on the flexible display panel 10 during rolling, reducing the stress and avoiding damage to the flexible display panel 10. Compared to the support shown in FIG. 12, in FIG. 13, the surface, proximal to the flexible support layer 21, of the support strip 22 is also able to increase the contact area between the support strip 22 and the flexible support layer 21, which facilitates the connection between the two. In some embodiments, the second fillet 221 has a radius ranging from 0.2 mm to 5 mm.

FIG. 14 is a schematic structural diagram of a support according to some embodiments of the present disclosure. As shown in FIG. 14, the support further includes a planar support layer 23, disposed in a planar support region b and on the first surface 21a of the flexible support layer 21.

The planar support layer 23 is configured to increase the stiffness of the flexible support layer 21 in the planar support region b, such that the support 20 supports the flexible display panel 10 more stably.

Similar to the support strip 22, the planar support layer 23 and the flexible support layer 21 are an integral structure, such as in FIG. 2, or are independent structures, such as shown in FIG. 14. In the case that the planar support layer 23 and the flexible support layer 21 are independent structures, the planar support layer 23 and the flexible support layer 21 are made of the same or different materials. The planar support layer 23 is made of a metal material, such as stainless steel or titanium alloy. A thickness of the planar support layer 23 and the thickness of the support strip 22 are the same, such that an overall thickness of the support is more uniform.

As shown in FIG. 14, a surface, away from the flexible support layer 21, of the planar support layer 23 has an accommodation groove 23a.

The accommodation groove 23a is configured to accommodate a flexible circuit board of the flexible display module, which is conducive to reducing the thickness of the flexible display module.

In some embodiments, the accommodation groove 23a is rectangular, a width D4 of the accommodation groove 23a ranges from 20 mm to 200 mm, a length L ranges from 10 mm to 1,000 mm, and a depth of the accommodation groove 23a ranges from 0.2 mm to 2 mm. The length, width, and depth of the accommodation groove 23a are defined according to a size of the flexible circuit board to be accommodated.

As shown in FIG. 14, the support further includes a curved support layer 24, disposed on the first surface 21a of the flexible support layer 21 and in a curved region c.

Similar to the support strip 22, the curved support layer 24 and the flexible support layer 21 are an integral structure or independent structures. In the case that the curved support layer 24 and the flexible support layer 21 are independent structures, the curved support layer 24 and the flexible support layer 21 are made of the same or different materials. The curved support layer 24 is made of a metal material, such as stainless steel or titanium alloy. A thickness of the curved support layer 24 is the same as the thickness of the planar support layer 23, such that the overall thickness of the support is more uniform.

In some embodiments, in the curved region c, a total thickness of the curved support layer 24 and the flexible support layer 21 is greater than or equal to 0.2 mm.

Some embodiments of the present disclosure further provide a method for manufacturing a support of a flexible display module, which is configured to manufacture the support shown in FIG. 1 to FIG. 14. In this method, the support is manufactured by forming a plurality of support strips 22 on a first surface 21a of a flexible support layer 21.

The flexible support layer 21 has a first surface 21a and a second surface 21b opposite to each other, wherein the second surface 21b is configured to support the flexible display panel. The plurality of support strips 22 are in a slidable-rollable region a. The plurality of support strips 22 are successively arranged along a first direction X away from a planar support region b. The first direction X is parallel to the first surface 21a and is intersected with a lengthwise direction of the support strip 22.

FIG. 15 is a flowchart of a method for manufacturing a support of a flexible display module according to some embodiments of the present disclosure. As shown in FIG. 15, the method includes the following steps.

In step S11, a sheet is provided.

For a support in which the support strip 22 and the flexible support layer 21 are an integral structure, the support is acquired by processing a whole piece of sheet. The sheet is a metal plate, such as stainless steel or titanium alloy.

In step S12, the plurality of support strips 22 and the flexible support layers 21 are formed by processing at least one side of the sheet.

In some embodiments, the support strip 22 is manufactured by processing the sheet by etching or CNC machining. In the case that a portion of the flexible support layer 21 has a pattern 211, the pattern 211 is formed on the flexible support layer 21 by etching or CNC machining.

Upon step S12, an elastic filler 213 is formed between adjacent support strips 22. In addition, a curved region c is formed by stamping the flexible support layer 21.

FIG. 16 is a flowchart of a method for manufacturing a support of a flexible display module according to some embodiments of the present disclosure. As shown in FIG. 16, the method includes the following steps.

In step S21, a flexible support layer 21 and a plurality of support strips 22 are manufactured separately.

For a support in which the support strip 22 and the flexible support layer 21 are independent structures, the manufacturing of the support strip 22 and the flexible support 20 is performed separately.

In some embodiments, both the flexible support layer 21 and the support strip 22 are formed by processing and manufacturing by CNC machining. In the case that a portion of the flexible support layer 21 has a pattern 211, the pattern 211 is formed on the flexible support layer 21 by etching or CNC machining.

In step S22, the plurality of support strips 22 are connected to a first surface 21a of the flexible support layer 21.

In some embodiments, the support strips 22 are bonded to the first surface 21a of the flexible support layer 21.

For a support 20 including the elastic filler 213, in manufacturing the support 20, such as manufacturing the support 20 shown in FIG. 12 or FIG. 13, an elastic filler 213 is formed first, then the elastic filler 213 is utilized to connect the plurality of support strips 22 as a whole, and then the whole unit is bonded to the flexible support layer 21.

Upon completion of the bonding, a curved region c is formed by stamping the flexible support layer 21.

The technical solutions according to the embodiments of the present disclosure achieve at least the following beneficial effects.

In the support of the flexible display module, by providing the plurality of support strips in the slidable-rollable region of the flexible support layer, at the position where the support strips are disposed, the thickness of the support is large, and the structural strength is high, such that the support performs better support, and at the position between adjacent support strips, the thickness of the support is small, and the structural strength is low, which is conducive to the rolling of the slidable-rollable region.

Described above are merely exemplary embodiments of the present disclosure, and are not intended to limit the present disclosure. Therefore, any modifications, equivalent substitutions, improvements, and the like made within the spirit and principles of the present disclosure shall be included in the protection scope of the present disclosure.

What is claimed is:

1. A support, comprising a flexible support layer and a plurality of support strips; wherein the flexible support layer has a first surface and a second surface opposite to each other, the second surface being configured to support a flexible display panel, and the flexible support layer comprises a slidable-rollable region and a planar support region adjacent to each other;

the plurality of support strips are disposed on the first surface and in the slidable-rollable region, and the plurality of support strips are successively arranged along a first direction away from the planar support region, wherein the first direction is parallel to the first surface and intersected with a lengthwise direction of the support strip; and the support further comprises an elastic filler disposed between adjacent support strips and connected to the flexible support layer and the support strip.

2. The support according to claim 1, wherein in the slidable-rollable region, the flexible support layer has a pattern, the pattern comprising a plurality of grooves and/or a plurality of through holes.

3. The support according to claim 2, wherein the pattern is between adjacent support strips.

4. The support according to claim 1, wherein a region, opposite to the support strip, of the second surface has a convex ledge, a lengthwise direction of the convex ledge being consistent with the lengthwise direction of the support strip.

5. The support according to claim 4, wherein a surface, distal from the support strip, of the convex ledge is a curved convex surface.

6. The support according to claim 4, wherein the convex ledge comprises a top surface and two side surfaces adjacent to the top surface, wherein the top surface is distal from the support strip, the two side surfaces are opposite to each other, one of the side surfaces being proximal to the planar support region, and a first fillet is provided at a connection between the side surface and the top surface.

7. The support according to claim 1, wherein the support strip has a cross section in the shape of a trapezoid, an upper base of the trapezoid being distal from the flexible support layer; or the support strip has a cross section in the shape of a rectangle.

8. The support according to claim 7, wherein side walls close to each other of adjacent support strips are concave surfaces.

9. The support according to claim 1, wherein a surface, distal from the flexible support layer, of the elastic filler is a curved concave surface.

10. The support according to claim 1, wherein a surface, proximal to the flexible support layer, of the support strip is a curved convex surface, and the elastic filler is in at least a portion region of the curved convex surface.

11. The support according to claim 1, wherein a second fillet is provided at a connection between a surface, proximal to the flexible support layer, of the support strip and a side wall of the support strip, and the elastic filler is disposed at the second fillet.

12. The support according to claim 1, further comprising a planar support layer, disposed in the planar support region and on the first surface, wherein a surface, distal from the flexible support layer, of the planar support layer comprises an accommodation groove.

13. The support according to claim 1, wherein the flexible support layer further comprises a curved region, disposed on a side, distal from the slidable-rollable region, of the planar support region.

14. The support according to claim 1, wherein in the first direction, a ratio of a distance between adjacent support strips to a width of the support strip ranges from 0.5 to 2.

15. A method for manufacturing a support, comprising:

forming a plurality of support strips on a first surface of a flexible support layer; wherein the flexible support layer comprises the first surface and a second surface opposite to each other, the second surface being configured to support a flexible display panel, and the flexible support layer comprises a slidable-rollable region and a planar support region adjacent to each other;

the plurality of support strips are disposed on the first surface and in the slidable-rollable region, and the plurality of support strips are successively arranged along a first direction away from the planar support region, wherein the first direction is parallel to the first surface and intersected with a lengthwise direction of the support strip; and the support further comprises an elastic filler disposed between adjacent support strips and connected to the flexible support layer and the support strip.

16. The method according to claim 15, wherein forming the plurality of support strips on the first surface of the flexible support layer comprises:

providing a sheet; and forming the plurality of support strips and the flexible support layer by processing at least one side of the sheet.

17. The method according to claim 15, wherein forming the plurality of support strips on the first surface of the flexible support layer comprises:

manufacturing the flexible support layer and the plurality of support strips separately; and connecting the plurality of support strips to the first surface of the flexible support layer.

18. A flexible display module, comprising: a flexible display panel and a support, wherein the support comprises a flexible support layer and a plurality of support strips; wherein the flexible support layer has a first surface and a second surface opposite to each other, the second surface being configured to support a flexible display panel, and the flexible support layer comprises a slidable-rollable region and a planar support region adjacent to each other; and the plurality of support strips are disposed on the first surface and in the slidable-rollable region, and the plurality of support strips are successively arranged along a first direction away from the planar support region, wherein the first direction is parallel to the first surface and intersected with a lengthwise direction of the support strip; wherein the support further comprises an elastic filler disposed between adjacent support strips and connected to the flexible support layer and the support strip; and the flexible display panel is disposed on the second surface of the support.

19. An electronic device, comprising: the flexible display module as defined in claim 18.

\* \* \* \* \*